June 19, 1962 W. M. SCHOLL 3,039,907
LAMINATED MATERIAL AND METHOD OF MAKING THE SAME
Filed Aug. 21, 1958
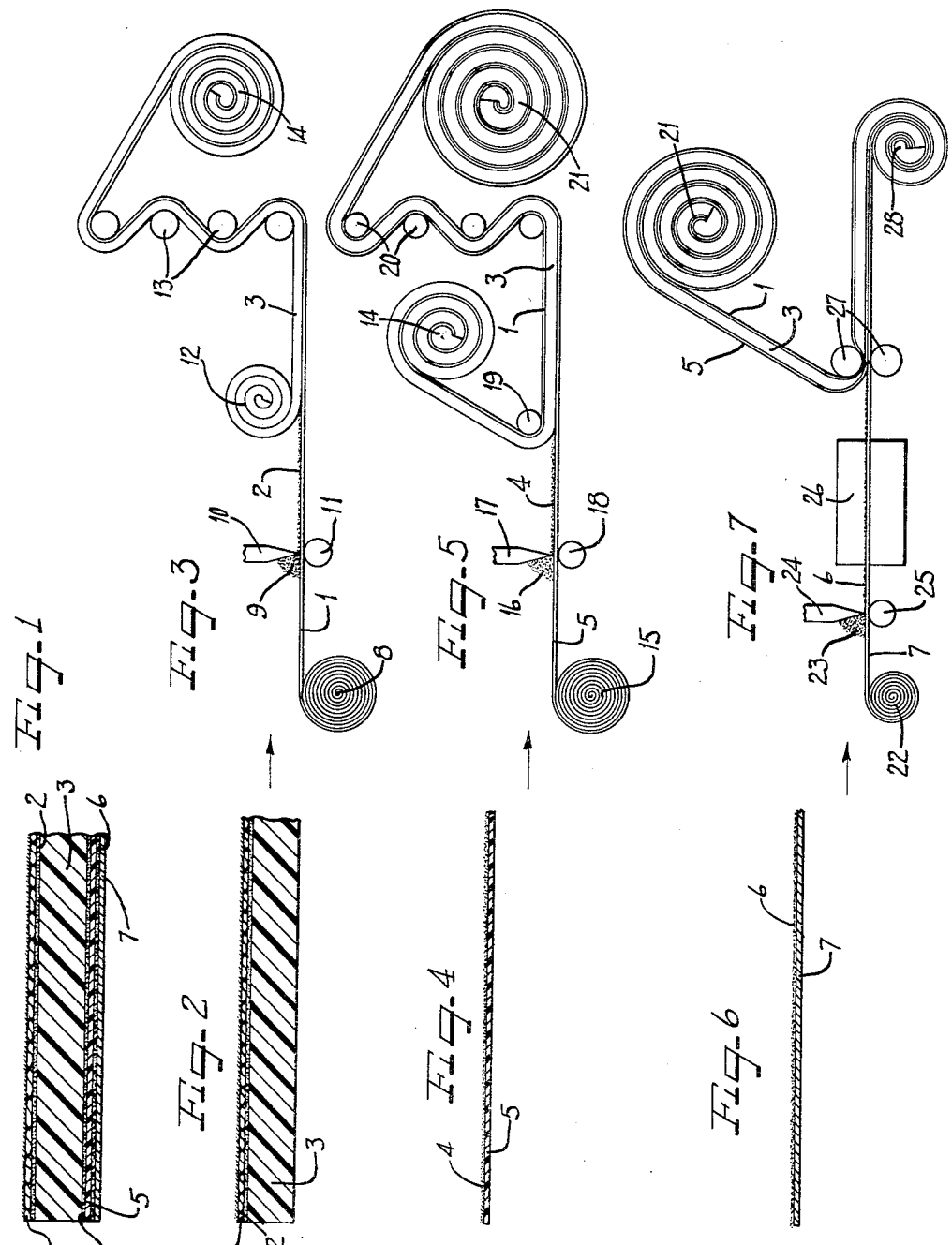
Inventor
William M. Scholl United States Patent Office 3,039,907
Patented June 19, 1962

3,039,907
LAMINATED MATERIAL AND METHOD OF MAKING THE SAME
William M. Scholl, 211–213 W. Schiller St., Chicago, Ill.
Filed Aug. 21, 1958, Ser. No. 756,354
4 Claims. (Cl. 154—53.5)

The instant invention relates to improvements in a laminated material and in a method of making the same, the material itself being a cushioning material from which surgical pads of desirable shapes may be cut for direct application to the human body, placing in articles of footwear or other articles of apparel, and the material might be used as a base or backing for trays, lamps, statues, and other objects commonly placed on polished surfaces, although there will be numerous other uses for the material, as will be apparent to one skilled in the art.

In the past, many and various types of cushioning material have been developed, but these formerly known materials have proven objectionable in that they were not as strong and durable as is desired, while yet possessing adequate resiliency and shock-absorbing power. Further, these formerly known materials were of constructions that did not lend themselves to methods of manufacturing that were desirably economical.

With the foregoing in mind, it is an important object of the instant invention to provide a laminated cushioning material that is extremely long lived, and possesses considerable strength.

Another object of the instant invention is the provision of a laminated cushioning material comprising an outer layer of highly napped fabric such as flannel or moleskin, an intermediate layer which is preferably chemical foam, and a bottom layer in the form of a thermoplastic film which carries a pressure-sensitive adhesive surface for attaching the cushioning material either to the body or to an object as may be desired.

A further object of the instant invention resides in the provision of a laminated cushioning material which may be manufactured by a simple and economical method.

Still another object of the instant invention is the provision of a new and novel method of making laminated cushioning material which method involves an extremely economical application of a protective facing sheet on the adhesive side of the resultant material.

Also an object of the invention is the provision of a method of making laminated cushioning material which embodies the application of a protective facing sheet during the making of the laminated material itself.

Still another object of the invention resides in the provision of making laminated cushioning material having an adhesive surface for attachment of the material to a body or an object, the method including the step of applying the attaching adhesive directly to the protective facing sheet in a manner to cause transference of the adhesive from the facing sheet to the laminated material.

While some of the more salient features, characteristics and advantages of the instant invention have been above pointed out, others will become apparent from the following disclosures, taken in conjunction with the accompanying drawing, in which FIG. 1 is an enlarged fragmentary vertical sectional view through laminated cushioning material embodying principles of the instant invention;

FIG. 2 is a fragmentary vertical sectional view of the upper two laminations of the structure seen in FIG. 1;

FIG. 3 is a diagrammatic view illustrating the process of making the dual laminated assembly of FIG. 2;

FIG. 4 is a sectional view of the bottom lamination showing the same with a cementitious coating thereon;

FIG. 5 is a diagrammatic view illustrating the step of forming the structure of FIG. 4 and uniting the same to the structure of FIG. 2;

FIG. 6 is a fragmentary sectional view of the facing sheet showing the same with a spread of pressure-sensitive adhesive thereon; and FIG. 7 is a diagrammatic view illustrating the process of making the structure of FIG. 6 and uniting the same to the assembled structures of FIGS. 2 and 4 to complete the material shown in FIG. 1.

As shown on the drawings:

In the drawings, the instant invention is of necessity shown exaggerated for purposes of clarity. It will be understood that in the finished material, the cementitious substance bonding the layers together is virtually invisible and the layers of material themselves in certain instances must be shown exaggerated so they can be properly illustrated.

The laminated material seen in FIG. 1 embodies a top lamination or sheet 1 which is preferably of a highly napped fabric, such as flannel or moleskin, and where the term moleskin is utilized herein and in the appended claims, it is to be considered synonymous with any soft pliable fabric having a relatively thick nap thereon. The top layer or sheet 1 is joined by a cementitious substance 2 to the upper face of an intermediate and much thicker lamination 3 which is preferably a foam material, such as polyurethane or polyvinyl chloride foam. The cementitious material 2 uniting the laminations 1 and 3 may be any suitable material, such as a synthetic rubber cement which usually contains a suitable solvent that is ultimately evaporated out or, as stated in the trade, flashed off.

The under face of the foam lamination 3 is bonded by means of a cementitious layer 4, which may be the same or similar cement as the layer 2, to the upper face of a bottom lamination 5 which is preferably a sheet of chemical film, such as a polyester or polyethylene terephthalate resin film, although other chemical films such as cellulose acetate might also be utilized. The polyester film is preferably, however, owing to its high thermal stability and its outstanding strength. Such a film will not deteriorate when the solvent in the cement is flashed off, and owing to its outstanding strength the film may be extremely thin and unsupported. On its under side, this film carries a spread of pressure-sensitive adhesive by which pieces of material may be attached to the human body, objects or to substantially any surface that may be desired. The pressure-sensitive adhesive is protected by a facing sheet 7 until time of use, when the facing sheet is stripped off and discarded. A highly satisfactory material for the facing sheet 7 is a 60 lb. double-faced silicone-treated parchment paper, which has an excellent release surface.

Obviously, the laminated material may be made in substantially any desired color. The outer moleskin layer 1 can be made in any color, and the foam lamination or layer 3 may be provided in substantially any color. The film 5 is preferably transparent.

The resultant laminated material is highly resilient and possesses extreme shock-absorbing properties. The moleskin and foam layers complement each other in that each adds to the durability of the other, whereby the laminated structure is longer lived than either the foam or moleskin used alone. The moleskin effectively protects the foam from abrasion, while the foam provides a resilient backing for the moleskin enabling it to better resist rubbing and pressure.

In use, it is a simple expedient to take a sheet of the laminated material, and cut off a piece of the desired size and shape, remove the facing sheet 7, and affix the material to whatever surface is desired by way of the pressure-sensitive adhesive spread 6. For example, a U-shaped piece might be cut and placed directly on the foot of a user around a corn or callus. A crescent-shaped piece might be cut and inserted in the rear of a shoe to prevent heel blisters or wear on a stocking. A number of small pieces or a large piece may be placed under the base of a lamp or disposed on the bottom of a tray or some other object frequently resting on polished surfaces. Numerous other uses will occur to one skilled in the art.

The instant invention lends itself to an extremely economical and facile method of manufacture. In the preferred process, the moleskin sheet 1 is first laminated to the foam sheet 3 to produce the structure shown in FIG. 2. With reference to FIG. 3, it will be seen that the moleskin sheet 1 is preferably unwound from a stock roll 8 with the unnapped side uppermost, and is preferably drawn over a suitable bed or table, not illustrated. A gob or mass 9 of cement may be disposed on top of the sheet 1 in advance of a doctor blade 10 which operates directly over a backing roll 11, thereby providing an even cementitious spread 2.

As the inverted sheet 1 travels along, a stock roll 12 of the chemical foam is placed by hand on the cement 2, and gently unrolled by hand as the sheet 1 passes along. Thus, the foam layer 3 is bonded to the moleskin layer 1 under substantially no pressure and under no tension. The only pressure is the weight of the stock roll 12, and a considerably large piece of the foam material will weigh but a few ounces. The double lamination now formed is then preferably festooned through a series of rollers 13 to insure adequate adhesion between the laminations, and during which time the solvents in the cement may be flashed off. The dual lamination is then preferably rolled as indicated at 14.

With reference now to FIG. 5, it will be seen that the film sheet 5 is preferably unwound from a stock roll 15 and passed along over a bed or table as above described beneath a gob or mass 16 of cementitious material disposed in advance of a doctor blade 17 acting over a backing roll 18. In this manner, the film 5 is coated with the cement layer 4. As the cemented film travels along, the previously made dual lamination is unwound from the roll 14 beneath a guide roller 19 which preferably does not apply any pressure to the dual lamination, and laid over the cemented film sheet 5 to bond the exposed surface of the foam layer to the film by the cement 4. The triple lamination now provided may be festooned over suitable rolls 20 and the solvent flashed off from the cement, after which it is preferably wound into a roll 21.

Now, with reference to FIG. 7 it will be seen that the facing sheet 7 is unwound from a stock roll 22 and carried along in the manner above described beneath a gob or mass 23 of pressure-sensitive adhesive disposed in advance of a suitable doctor blade 24 acting over a backing roll 25, whereby the facing sheet 7 is provided with the pressure-sensitive adhesive spread 6 which later appears on the under side of the film 5. The adhesive may be cured by passing through a suitable oven diagrammatically indicated at 26 to provide the structure illustrated in FIG. 6. As the adhesived facing sheet travels along, the triple lamination is unwound from the aforesaid roll 21 and the exposed face of the film layer 5 is brought into contact with the adhesive 6. The structure at the time of contact is preferably squeezed under relatively high pressure between a pair of squeeze rolls 27, and the completed laminated material carrying the facing sheet 7 is then would into a roll 28 ready for delivery to the consumer.

The pressure between the squeeze rolls 27 is sufficient to cause a transference of the pressure-sensitive adhesive 6 from the facing sheet 7 to the film layer 5, and when the facing sheet 7 is stripped from the laminated material, all the pressure-sensitive adhesive which was first applied to the facing sheet remains on the under face of the film 5. It will be noted, therefore, that the facing sheet is applied to the resultant product during the completion of the product itself, and the facing sheet need not be applied to the product after it has been completed, or the product need not be formed on the facing sheet.

Accordingly, the method for producing the laminated material is extremely facile, requires little labor, and is highly economical.

The roll 28 of finished product may, of course, be severed into any desired width, cut into any desired sizes of pieces, be used with dies for the stamping out of pieces, or manipulated in substantially any manner in the event individual pieces or designs of known size and style are to be sold.

From the foregoing, it is apparent that I have provided a novel laminated material of extreme shock-absorbing ability, which possesses great durability and strength, and which may be made by an economical method.

It will be understood that modifications and variations may be effected without departing from the scope of the novel concepts of the present invention.

I claim as my invention:

1. A laminated cushioning material comprising a top layer of moleskin with the napped side uppermost, a thicker layer of thermoplastic foam cemented to the underside of said moleskin, a thin thermoplastic film cemented to the underside of said foam layer, a spread of pressure-sensitive adhesive on the under face of said film, and a facing sheet having a release surface over said adhesive spread to protect the same until time of use.

2. In a method of making a laminated material, the steps of applying a cementitious substance to one surface of a sheet of moleskin, and bonding a thicker layer of thermoplastic foam to said sheet under no pressure but the weight of the foam to avoid tension therein to provide a double laminated material, applying a cementitious substance to one face of a thermoplastic film, and bonding the exposed foam side of said double laminated material to said film by the substance under substantially no pressure to provide a triple laminated material, applying a pressure-sensitive adhesive to one side of a facing sheet having a release surface, applying said triple laminated material to said adhesive with the underside of said film contacting the adhesive and using sufficient pressure to cause transference of the adhesive from the facing sheet to the film, whereby the facing sheet may readily be peeled off at the time the resultant material is put to use.

3. In the method of making a laminated material, the steps of bonding face to face a sheet of moleskin and a sheet of thermoplastic foam with the foam in a completely relaxed condition, bonding the exposed face of the foam to a sheet of thermoplastic film, applying a pressure-sensitive adhesive to a facing sheet having a release surface and adhering the exposed face of said film to said adhesive under pressure.

4. In the method of making a laminated material, the steps of bonding a flexible thermoplastic film and a thicker sheet of resilient thermoplastic foam together in face to face relationship with the foam in a relaxed condition, coating one side of a facing sheet having a release surface with a pressure sensitive adhesive, and adhering the exposed surface of said film to said adhesive under sufficient pressure to cause said adhesive to remain on said film when the facing sheet is removed.

References Cited in the file of this patent

UNITED STATES PATENTS

| | | |
|---|---|---|
| 2,121,678 | Armor | June 21, 1938 |
| 2,326,581 | Van Cleef | Aug. 10, 1943 |
| 2,712,311 | Scholl | July 5, 1955 |
| 2,725,325 | Seymour | Nov. 29, 1955 |
| 2,759,475 | Van Swaay | Aug. 21, 1956 |
| 2,965,532 | Taylor | Dec. 20, 1960 |
| 3,021,250 | La Voie | Feb. 13, 1962 |

FOREIGN PATENTS

| | | |
|---|---|---|
| 1,134,599 | France | Dec. 3, 1956 |